Dec. 23, 1969  R. B. REINARTS  3,485,522
AUXILIARY CAB FOR PICKUP TRUCK

Filed March 26, 1968  2 Sheets-Sheet 1

INVENTOR.
ROBERT B. REINARTS

BY Schroeder, Siegfried
+ Ryan
ATTORNEYS

Dec. 23, 1969    R. B. REINARTS    3,485,522
AUXILIARY CAB FOR PICKUP TRUCK
Filed March 26, 1968    2 Sheets-Sheet 2

INVENTOR.
ROBERT B. REINARTS
BY Schroeder, Siegfried
& Ryan
ATTORNEYS

United States Patent Office 3,485,522
Patented Dec. 23, 1969

3,485,522
AUXILIARY CAB FOR PICKUP TRUCK
Robert B. Reinarts, 1417 8th St. SW.,
Minot, N. Dak. 58701
Filed Mar. 26, 1968, Ser. No. 716,111
Int. Cl. B62d 33/04; B60p 3/32
U.S. Cl. 296—24                                10 Claims

ABSTRACT OF THE DISCLOSURE

The disclosure is directed to an auxiliary cab used with a pickup truck cab having a pair of doors which open over the sides of the truck box for gaining entry thereto and a rear door opening under the passenger seat providing storage space, the front and sidewalls of the auxiliary cab terminating at the upper edge of the front and sidewalls of the truck box and the rear wall extending downwardly and terminating at the floor of the truck box, the auxiliary cab being releasably secured to the truck box and vehicle chassis.

---

This invention relates to the field of automotive vehicle devices and more particularly to the field of auxiliary passenger equipment contained in the truck box of a pickup truck.

On numerous occasions, it has been found desirable to provide additional passenger space for persons riding in a pickup truck. While various means have been devised to provide an additional seating arrangement, it has generally been done with little regard for the comfort of the passengers and generally speaking is not capable of being used in inclement weather.

The present invention is directed towards the use of an auxiliary cab which may generally be formed of a glass-fiber, and resin material or suitable metal, which may be fitted near the truck cab of a pickup truck in such a manner that passenger comfort is achieved and a ready access is provided for the passengers. The auxiliary cab is disposed to the rear of the truck cab in such a manner that the passengers seated therein ride in relative comfort and the cab is releasably secured to the truck box and rear portion of the truck cab in a quick and easy detachable manner.

It is therefore a general object of the present invention to provide an auxiliary passenger cab for use in a pickup truck.

It is still another object of this invention to provide an auxiliary passenger cab for use with a pickup truck which is releasably secured to the truck box.

It is still another object of this invention to provide an auxiliary passenger cab in which the passenger-support structure forms a storage compartment in the cab accessible through the rear wall thereof.

It is still a further object of this invention to provide convenient step and handle members for use with a pickup truck to aid in gaining access to the auxiliary cab.

These and other objects and advantages of the invention will more fully appear from the following description, made in connection with the accompanying drawings, wherein like reference characters refer to the same or similar parts throughout the several views, and in which.

Figure 1:
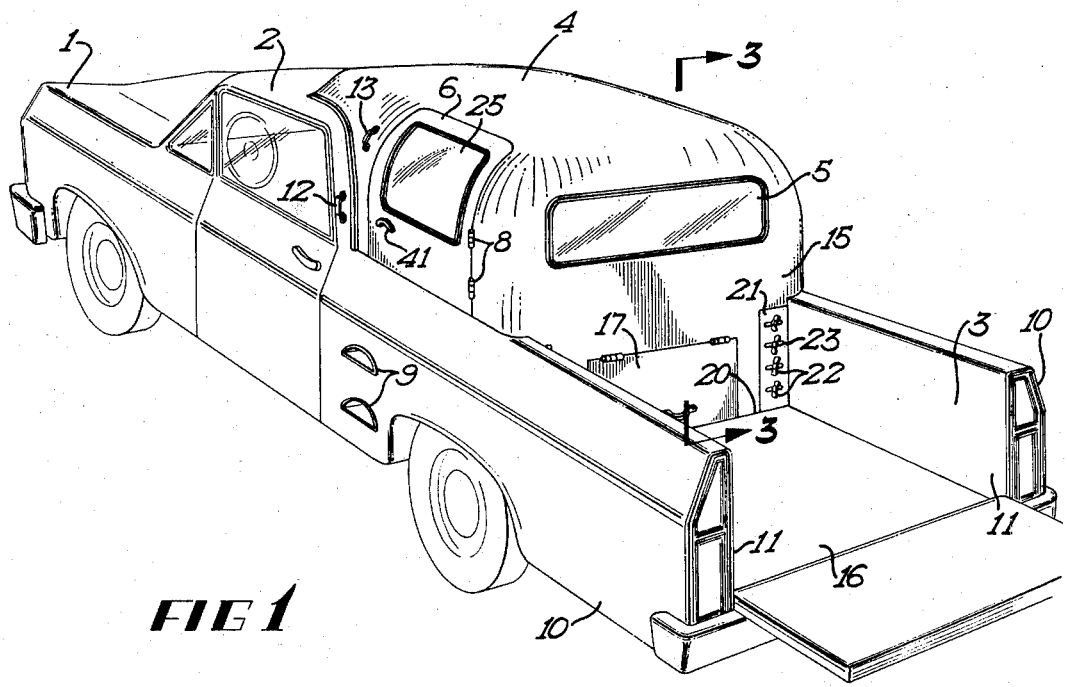
FIG. 1 is a perspective view as seen from the rear showing the auxiliary cab in place in a pickup truck.
Figure 2:
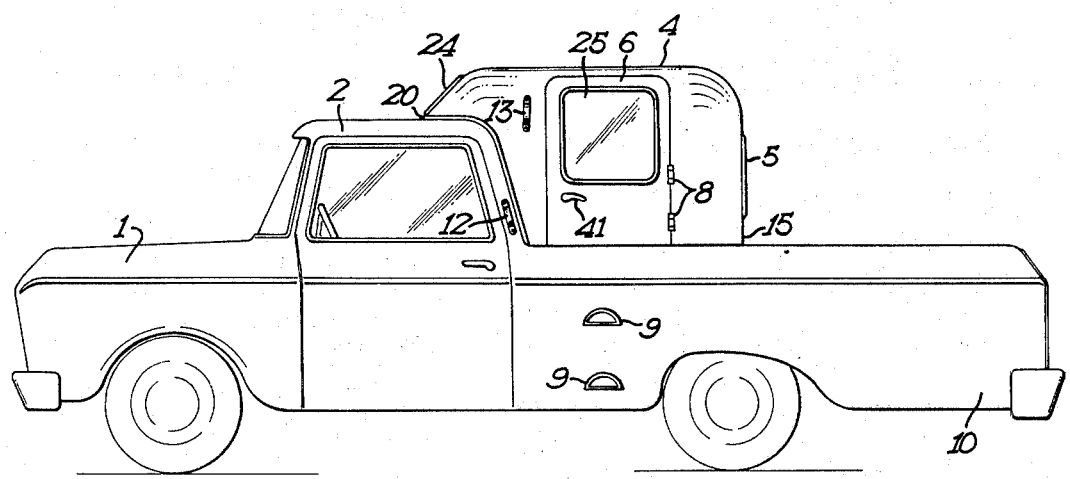
FIG. 2 is a side elevation of the pickup truck and cab assembly.

Referring now primarily to FIGS. 1 and 2 it will be seen that a pickup truck 1 has a truck cab 2 and a box 3 secured in the normal manner to the truck chassis. Situated in the forward portion of truck box 3 is an auxiliary cab 4 which is molded of a glass fiber, and resin construction and has a rear window 5 secured in the rear portion thereof. The auxiliary cab 4 has a pair of doors 6 and 7 (FIG. 3) formed therein and secured to the cab member by a suitable means such as hinges 8. It will be seen that the door is formed of the same contour as the upper portion of the cab and that the lower portion of the door swings over the truck box sidewall. To aid a person in entering through one of the doors, such as door 6, a pair of footstep members 9 are formed in the side of the truck box. That is, truck box 3 has an outer skin member 10 and an inner member 11 which are separated by approximately a 3 or 4 inch spacing so that steps 9 may project through skin 10 or the outer wall towards inner wall 11 and be secured to the outer wall by a suitable means such as machine screws. Steps 9 are formed below door 6 and a pair of handgrips or handles 12 and 13 are secured to the upper portion of the truck cab 2 and the upper portion of auxiliary cab 4 adjacent the door. It will be noted that a forward wall 14 of cab 4 has a contour matching that of the rear portion of truck cab 2, the sides of auxiliary cab 4 and the front portion thereof terminating and being flush with the top of the truck box. A rear wall 15 of auxiliary cab 4 extends downwardly to a floor level 16 formed by the floor of box 3 and an access door 17 is formed in the rear wall 15 of auxiliary cab 4. Secured along the bottom of rear wall 15 and the lower edges of the sidewalls and front wall of auxiliary cab 4 is a seal 20 which may be in the form of a sponge-like material or other suitable means which resists checking and cracking due to weather extremes.

In order to provide an additional sealing quality along the edge of the rear wall 15 and the inner sides of the box such as sides 11, a plate member 21 is formed having the same contour as the contour of panel member 11 forming the inside of the truck box and plate 21 is held in place by suitable means such as screws or bolts 22 which pass through a plurality of slots 23 formed in plate 21 in a transverse manner. That is, the slots are formed in plate 21 so that the plate may be moved laterally into a flush relationhsip with the sidewalls of the truck box to form a good weather-tight seal.

Figure 3:
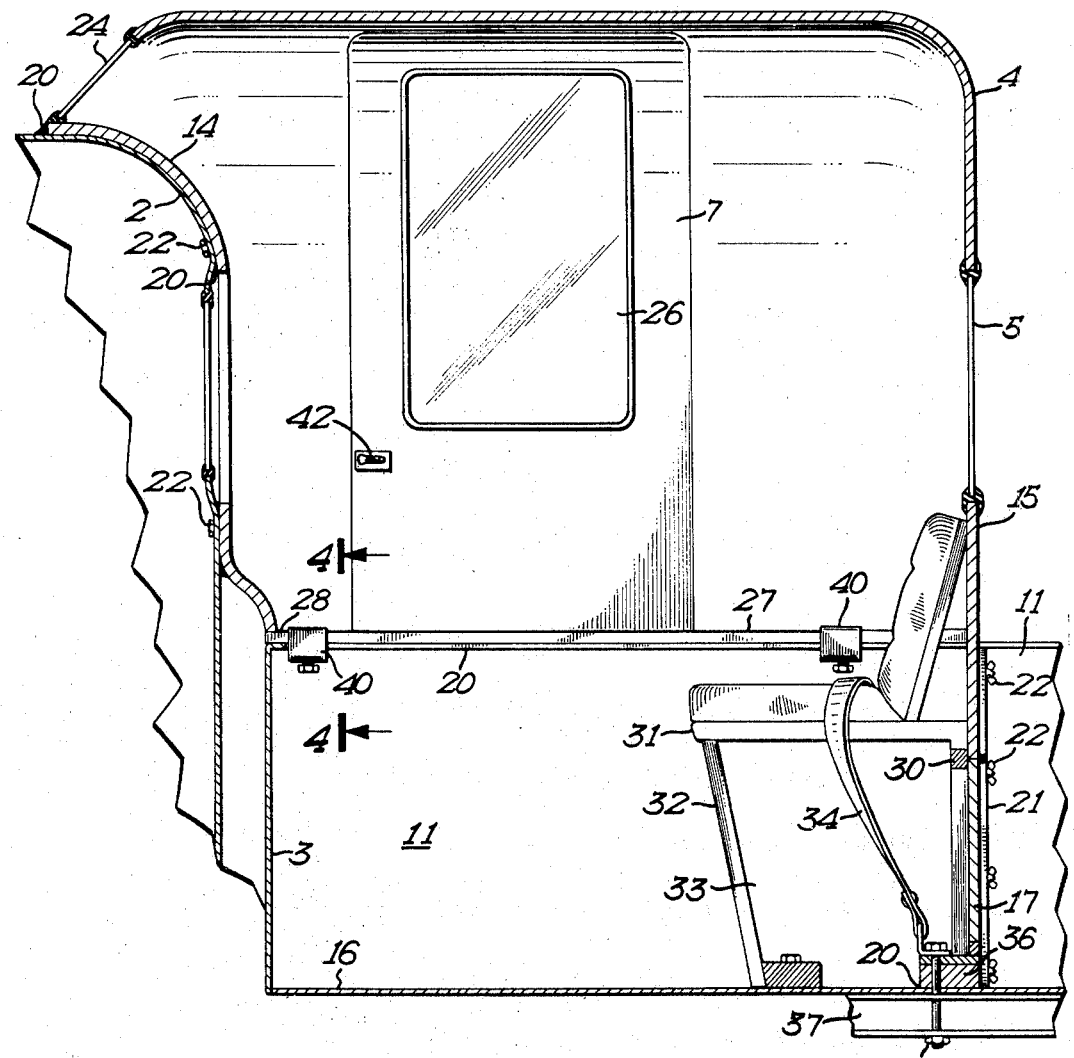
FIG. 3 is a partial section of the auxiliary cab and truck box showing the relative arrangement of the two structures.
Figure 4:
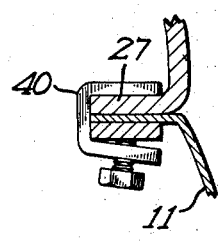
FIG. 4 is a sectional view of a securing device used to secure the auxiliary cab to the truck box.

Referring principally to FIG. 3, there is shown auxiliary cab 4 in place within truck box 3, it will be observed that the front portion of auxiliary cab 14 is formed in the same contour as truck cab 2 to give a good tight-fitting relationship. Where desirable, the rear window of truck cab 2 may be removed and thus an access port or door is formed between the truck cab and the auxiliary cab. Suitable means such as screws 22 may be used to secure truck cab 2 to the front wall 14 of the auxiliary cab and suitable sealing means may also be applied, such as seal 20 described previously. The upper forward portion of cab 4 contains a window 24 as does both doors 6 and 7 which contain windows 25 and 26 respectively. Secured across each side at the lower extremity of the sides of the auxiliary cab, are a pair of structural members 27 (one of which is shown in FIG. 3) and a similar member 28 is secured across the top of the front portion of truck box 3. Another structural member 30 is secured across the rear wall 15 of auxiliary cab 4 and door 17 is hingedly secured thereto through suitable means.

A body support or seat 31 is secured to rear wall 15 by suitable means and includes a front support panel 32 which extends downwardly from the front portion of the body support member, panel 32 terminating at floor 16 and extending the full width of auxiliary cab 4. Thus, a storage compartment 33 is formed thereunder and this, of course, is accessible through door 17 described previously. Where desirable, a seat belt 34 may also be used and is held in place by a carriage bolt 35 passing through another structural member 36, which is formed integrally with or secured to real wall 15 of auxiliary cab 4, floor 16, and a chassis member 37 of pickup truck 1. In other words, carriage bolt 35 secures the rear portion of cab 15 to the floor and chassis member as well as the support member for the passengers riding in the cab.

A clamping member 40 is used wherever required to secure the edges of the auxiliary cab to the truck box in a releasable manner. Thus it is a rather minor task to use the auxiliary cab with a regular pickup truck. A pair of latches 41 and 42 are used to secure doors 25 and 26 respectively. Clamping member 40 has a means of tightening the clamp to hold the auxiliary cab member in place and may be used to properly secure the front and sidewalls of the auxiliary cab. It will thus be observed that with the exception of several small holes formed in the floor 16 of the truck box, that no additional work is needed to secure the cab to the truck box.

By allowing doors 25 and 26 to swing over the top of the truck box sides, a passenger may readily enter the passenger cab by the use of steps 9 to gain access thereto. It will also be observed that through the use of structural member 36 extending the width of the truck box, and in cooperation with seal 20, the floor of the truck box remains relatively dry and thus storage compartment 33 is also maintained in a dry condition, regardless of the outside weather.

It will, of course, be understood that various changes may be made in the form, details, arrangement, and proportions of the parts without departing from the scope of the invention which consists of the matter shown and described herein and set forth in the appended claims.

What is claimed is:

1. An auxiliary cab for use with a truck, the combination comprising:
   (a) a pickup truck having a cab and a low-walled open box extending readwardly therefrom, both of which are secured to a vehicle chassis;
   (b) an auxiliary enclosed passenger cab constructed and arranged and mounted within the front portion of said truck box, said auxiliary cab having a front wall and a pair of sidewalls extending downwardly and terminating at the upper edge of the front and sidewalls of said truck box and having a rear wall extending downwardly and terminating at the floor of said truck box, said auxiliary cab having at least one hinged door formed in said sidewalls for providing passenger access thereto;
   (c) first securing means releasably securing said front and sidewalls of said auxiliary cab to the front and sidewalls of said truck box;
   (d) and second securing means releasably securing said rear wall of said auxiliary cab to the floor of said truck box and to said vehicle chassis.

2. The invention as set forth in claim 1 including:
   (e) a pair of plate members adapted to be secured to said rear wall of said auxiliary cab having an outer contour matching the inner contour of said truck box;
   (f) and releasable securing means securing said pair of plate members to said rear wall of said auxiliary cab.

3. The invention as set forth in claim 1 including:
   (g) at least one step formed in the sidewall of the truck box and cooperatively disposed with respect to said door formed in said auxiliary cab for gaining admission thereto;
   (h) and a handle member secured to said truck cab adjacent said door formed in said auxiliary cab aiding admission thereto and cooperating with at least said one step.

4. The invention as set forth in claim 1 including:
   (i) sealing means secured to the lower edges of said auxiliary cab walls and cooperating with said truck box in sealing said auxiliary cab against weather elements.

5. The invention as set forth in claim 1 including:
   (j) a window including sealing means therefor disposed in the upper forward portion of said auxiliary cab having a height greater than said truck cab, said upper forward portion having a sloping surface terminating on the top of said truck cab.

6. The invention as set forth in claim 1 wherein said front wall of said auxiliary cab has substantially the same general contour as the real wall of said truck cab and has an opening formed therein cooperating with the rear window of said truck cab.

7. The invention as set forth in claim 1 wherein said first securing means is constructed and arranged like a C-clamp, said terminal portions of front and sidewalls of said auxiliary cab having right-angle elements formed therewith overlying said truck box, said C-clamp securing said elements and said truck box in communicating relationship.

8. The invention as set forth in claim 1 including:
   (k) passenger support means facing forward having the rear portion thereof secured to said rear wall of said auxiliary cab, the front portion of said passenger support means extending to, and being supported by, the floor of said truck box forming a compartment thereunder.

9. The invention as set forth in claim 8 including:
   (l) a compartment door formed in said rear wall of said auxiliary cab communicating with the compartment formed under said passenger support means.

10. The invention as set forth in claim 8 including:
    (m) a structural member integrally formed with the bottom edge of said rear wall of said auxiliary cab and extending the full width of said truck box.

References Cited

UNITED STATES PATENTS

| | | | |
|---|---|---|---|
| 2,426,772 | 9/1947 | Holan | 296—24 |
| 2,559,029 | 7/1951 | Randolph | 296—24 |
| 2,971,794 | 2/1961 | Garcia | 296—26 |
| 3,169,792 | 2/1965 | Viquez | 296—26 X |
| 3,390,913 | 7/1968 | Hunter | 296—10 |

RICHARD J. JOHNSON, Primary Examiner